Dec. 6, 1932.     J. J. SANTIAGO     1,890,022
HOLE STRAIGHTENER
Filed Dec. 14, 1929     2 Sheets-Sheet 1
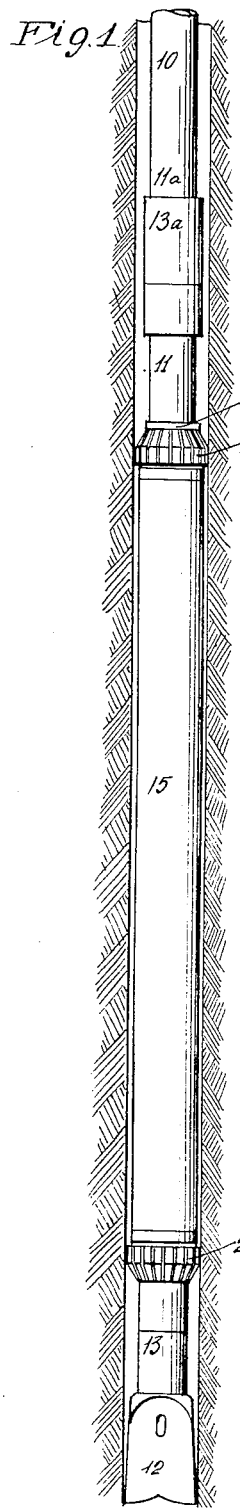
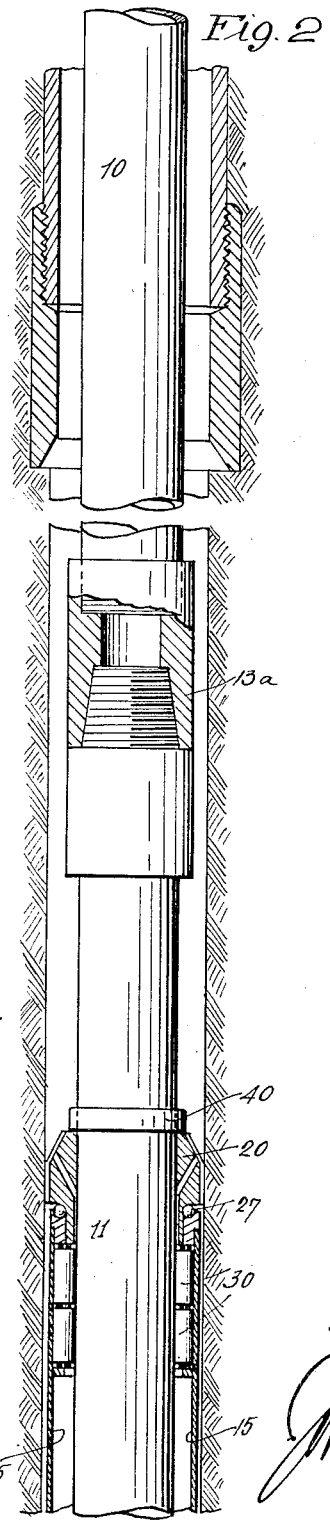
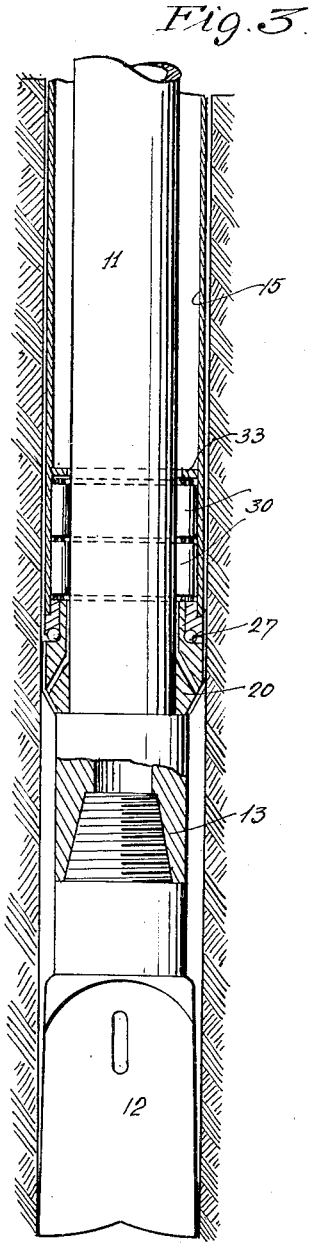
Inventor
James J. Santiago.
Attorney.

Dec. 6, 1932.   J. J. SANTIAGO   1,890,022
HOLE STRAIGHTENER
Filed Dec. 14, 1929   2 Sheets-Sheet 2
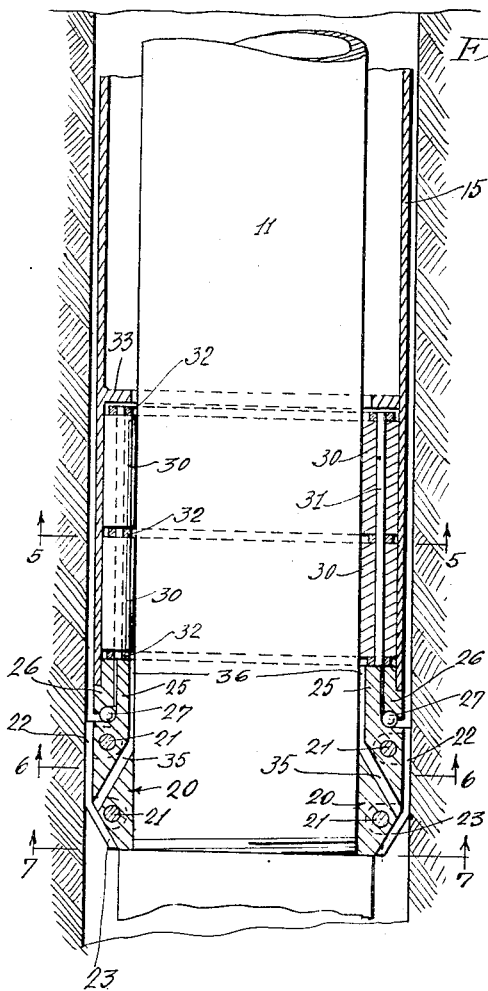
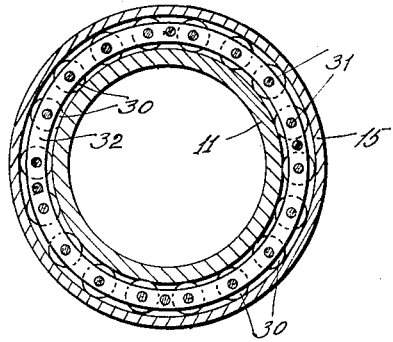
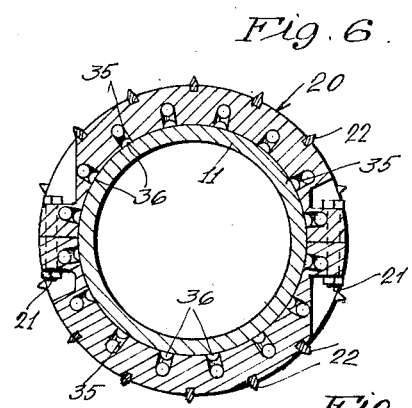
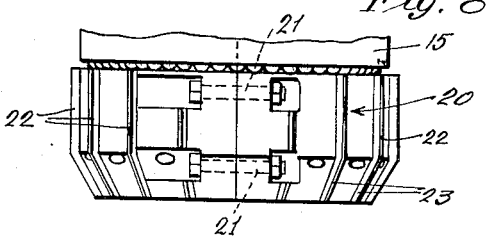
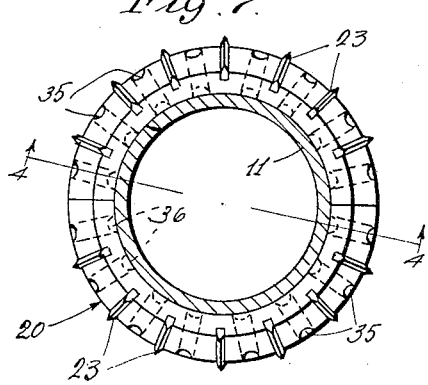
Inventor
James J. Santiago
Attorney.

Patented Dec. 6, 1932

1,890,022

UNITED STATES PATENT OFFICE

JAMES J. SANTIAGO, OF LOS ANGELES, CALIFORNIA, ASSIGNOR TO JOHN GRANT, OF LOS ANGELES, CALIFORNIA

HOLE STRAIGHTENER

Application filed December 14, 1929. Serial No. 414,072.

This invention relates to a device for guiding a drill tool to drill a straight hole, and also for rounding out and straightening up the hole, either while the initial drilling is being done, or afterwards.

As is now well known in the deep well drilling art, deep drill holes are sometimes very crooked; even those holes which have in the past been called straight are now found to deviate very largely from a true vertical line below the starting point.

Most deviations from true straightness in a drill hole are caused by successive variations of strata structure and tilt as met by the drilling tool. The drilling tool constantly tends to be shifted laterally off the true line of the bore, and there is comparatively little constraining force exerted by the drill stem to keep the drilling tool on the true course. In rotary practice, although the rotary drill pipe is relatively stiff when considered in short lengths; yet the whole length of a long rotary drill pipe is extremely flexible. It has been aptly compared in flexibility to a fine steel wire; i. e., a wire approximately 1/100ths of an inch in diameter and one hundred inches long. The flexibility of a typical drill pipe in a fairly deep well can readily be visualized. The drill pipe is necessarily of smaller diameter than the hole being drilled; and thus space is allowed for flexure of the drill pipe when the drilling tool has any tendency to run off laterally.

The general object of my invention is to provide a device which may be considered either in the nature of an attachment for the drill pipe or a length thereof, or in the nature of a special length of drill pipe, and which will, in effect, stiffen a suitable length of drill pipe at or near the drilling tool, and so fitting the hole as to guide the drill straight ahead. I say the drill pipe is stiffened in effect, because the part which I apply to the drill pipe is a relatively unbending member. Viewed as an attachment, however, it may be said that the original drill pipe to which the attachment is applied is not stiffened, but that the attachment provides the stiff guiding member which guides the flexible drill pipe.

All of this will be better understood from the following detailed description and the accompanying drawings wherein I set out in now preferred and illustrative detail one form of the invention's embodiment. I shall describe this illustrative form in its preferred detail; not for the purpose of limiting the invention necessarily thereto, but so that those skilled in the art may understand the invention itself through the medium of a thorough understanding of one form.

In the accompanying drawings, Figure 1 is a longitudinal elevation showing my hole straightener applied to the lower end of a drill pipe above the drilling tool, and as it appears in operation in the well;

Fig. 2 is an enlarged longitudinal sectional view of the upper parts of Fig. 1;

Fig. 3 is a similar view of the lower parts of Fig. 1;

Fig. 4 is a further enlarged detail section of certain parts of Fig. 3;

Figs. 5, 6 and 7 are cross-sections on lines 5—5, 6—6 and 7—7, respectively, of Fig. 4; and Fig. 8 is a fragmentary side elevation of the parts shown in Fig. 7.

In the drawings I show a typical drill pipe 10 made up, in the usual manner, of sections 11, 11a, to the lower end of which a typical drilling tool 12 is attached. The drilling tool here illustrated is a fish-tail bit, although other bits may be used. The bit is joined to the lower end of the drill pipe by means of a tool joint 13 whose structure is well known in the art. The sections or stands of drill pipe are usually joined together by such tool joints, the next one above the drilling bit being shown at 13a. Usually three or four lengths of drill pipe of about 20 feet each are included in what is known as a "stand," the lengths within a stand being joined by the usual pipe collars, while the stands are joined by the tool joints. In the use of my invention the lowermost drill pipe section 11, to which my invention is applied, may either be considered as a single length of drill pipe, or as a section made up of more than one length. In any case, whether this lowermost section comprises one or more lengths of drill pipe, it is preferable to join it to the next section or stand above by a tool joint 13a, so that the special section may be, as a unit, easily placeable in and removable from the drill pipe.

In accordance with my invention, I enclose this lower drill pipe section 11 in a larger and comparatively stiff tube 15, which is preferably of an external diameter slightly smaller than the size of the hole supposed to be drilled by drilling tool 12. In the case of a fish-tail bit the external diameter of tube 15 is thus slightly smaller than the cutting width of the fish-tail bit. I have here referred to the diameter of the hole the bit is supposed to cut, for two reasons; a fish-tail bit, which is the one most usually used, does not always cut a hole to a true circle, but often cuts a hole whose section is a sort of curved-sided triangle; and also, as the bit wears down, it does not cut the full size. The amount of clearance of tube 15 in the full-sized hole is preferably small so that, to all intents and purposes, it may be said to fit the full-sized hole rather closely. The purpose of the clearance is to avoid excessive surface friction and any possible binding and to allow fluid circulation outside the guide tube, as hereinafter set out.

This guiding tube 15 preferably does not rotate with the drill pipe, again for the purpose of reducing or eliminating excessive rubbing friction and wear. Thus it is preferably mounted on the drill stem by means of suitable rotary bearings so that the drill stem or pipe may rotate within the guiding tube. At the same time, however, the drill pipe is provided, at the ends of the tube, with reaming cutters which do rotate with the drill pipe and serve to ream or clean out the drilled hole to its proper full rotundity and diameter; with the dual result of bringing the hole to full and true size regardless of how the drilling tool may be cutting, and also of making sure that the guide tube 15 has full, free and straight passage through the hole.

Although I have said that the guide tube preferably does not rotate with the drill pipe, I do not mean that it is either necessarily or positively held against rotation. It is preferably mounted on the drill pipe through the medium of rotary bearings, but at the same time it is free to stand still or rotate as it may. In case the rotary bearings should, for any reason, become jammed and thus, in effect, give the guide tube a solid non-rotational bearing upon the drill stem at its two ends, the guide tube will of course rotate with the drill stem. It will still, under such conditions, perform its office as a guide tube, although it may rotate and wear against the side of the hole. It is thus within my invention in some aspects that the guide tube may rotate with the drill pipe.

The structures at the upper and lower ends of guide tube 15, as here illustrated, are duplicates, so a detailed description of the lower structure shown in Fig. 4 will suffice for both.

In Figure 4 the lower tool joint 13 is shown fragmentarily, and immediately above that is what I shall call a reaming ring 20 mounted upon drill pipe section 11, tightly clamping or otherwise set upon the drill pipe so as to rotate therewith. Any method of solidly attaching the reaming ring to the drill pipe section may be used—here I show the reaming ring made up of two half-ring sections secured together and clamped around the drill pipe by bolts 21.

This reaming ring has a cylindric surface which is provided with vertically extending cutting teeth 22, and a lower tapered or conical surface provided with diagonally extending cutting teeth 23. The external diameter of cutting teeth 22 is substantially equal to the diameter which the drilling tool is supposed to cut—equal to full hole diameter, and therefore slightly greater than the external diameter of guide tube 15.

The upper end of this reaming ring has an upwardly extending reduced sleeve 25 around which a tube mounting ring 26 fits more or less loosely. The radial bearing for tube 15 is preferably not through any bearing of ring 26 on sleeve 25, but rather through roller bearings which I shall describe. Between ring 26 and the reaming ring 20 are end-thrust bearings 27. The end of guide tube 15 is force-fitted over ring 26, so that, insofar as the operation of the device is concerned, the mounting ring 26 becomes, in effect, a part of the tube 15, although the ring is removable for purpose of bearing replacement.

Inside tube 15 and immediately above ring 26 is a roller bearing preferably made up as illustrated. The rollers 30 are preferably of some substance like rubber, mounted on shafts or pins 31, which are held in cage rings 32. The construction of such a cage, made up of shafts and rings, is commonly known in the art and needs no detailed description; its function merely being to loosely space the rollers peripherally about the inner drill pipe 11. The roller bearing is held from endwise movement between the ring 26 and a flange ring 33, which may be welded or otherwise secured inside guide tube 15.

I have said that the rollers 30 are preferably made of some substance such as rubber. They may, of course, be made of any suitable substance; but I prefer a rubber-like substance, and preferably neither fully soft rubber nor fully hardened rubber, for several reasons: in the first place such rollers are not subject to the grinding wear to which steel or other metal rollers would be subject, and again, use of rubber or similar material for the rollers makes it unnecessary to machine the outside of the drill pipe or the inside of the guide tube as would be necessary, or as fully as would be necessary, were metal rollers used. As regards grinding wear, it must be remembered that these bearings are at all times submerged in the rotary drilling mud carrying upwardly the material which has been cut up by the drilling tool and the reaming ring. And rather than allow the bearings to be surrounded by a relatively quiet and stationary body of muddy fluid, which would otherwise stand within tube 15, I provide means for causing at least a portion of the circulation to travel through the tube 15.

Reaming ring 20 is provided with a number of diagonal circulation holes 35 which extend from the lower part of its outer surface diagonally inwardly to its inner bore. Here these holes connect with circulation grooves 36 formed in the inner cylindric surface of the reaming ring. These grooves lead upwardly to the upper end of the reaming ring so that the upwardly flowing fluid may then find its way between the rollers of the bearing and thence upwardly through the guide tube 15 around drill pipe 11. The structure at the upper end of the drill pipe is the same as has been described, so that the part of the fluid which thus passes through the guide tube eventually finds its way to the space within the drilled hole and around the upper part of the drill pipe, joining that part of the circulation fluid which has passed around the guide tube.

As I have said before, the guide tube has a slight clearance within the drilled and reamed hole. That clearance, for the purpose of illustration, is perhaps exaggerated in Fig. 1. The clearance may, as an illustration, be about one-eighth of an inch in diameter where the drill hole is say six inches in diameter. The clearance is sufficient to keep the guide tube from any possible binding and is also sufficient to allow a thin film or layer of circulating fluid to pass upwardly around the guide tube, to keep the walls of the drill hole mudded up around it, to wash out any material which might otherwise loosely flow in from soft strata and bind the guide tube, thus keeping the guide tube free at all times, and also to provide a circulation of fluid past the outsides of the reaming rings to carry away their cuttings. It will be understood, of course, that, although the external diameters of the projecting reaming teeth on the rings are full hole diameter, the spaces between teeth allow the circulation herein spoken of. For that purpose the teeth may be somewhat widely spaced, as illustrated in the drawings. These teeth, by the way, may either be formed integrally with the ring bodies or may be inserted into them or built up on them, all as is well known in the art.

I have indicated that the length of guide tube 15 may be as desired; it may correspond in length either to a single length of drill pipe or to a section made up of several drill pipe lengths. Whatever its length, its thickness and its material are such that the tube is relatively stiff. To all intents and purposes and in comparison with the flexibility of the drill pipe itself the guide tube may be regarded as sufficiently stiff to keep it substantially straight from end to end at all times. It is mounted on the drill pipe preferably immediately above the drilling tool 12, or immediately above the tool joint 13 by which the drilling tool is attached to the drill pipe; thus it may be longitudinally confined at the lower end by the tool joint 13 and at the upper end by any suitable element located somewhat below the upper tool joint 13a, leaving room under the tool joint 13a for application of an elevator or slips. Thus for instance the upper longitudinal confining member may be a collar 40, which may be welded, shrunk or otherwise fastened to the drill pipe.

The operation of my hole-straightener will be readily understood from the foregoing description. It will be apparent that the lower reaming rings 20 will ream and clean out the drilled hole to full size and rotundity so as to allow free passage for the guide tube 15. The guide tube will thus pass down through a full-sized hole and, fitting that hole fairly snugly, and being straight, will hold the drilling tool 12 to a true and straight course below it. The guide tube will at all times pass down the hole freely, because of its clearance and circulation of fluid around it. Although the section of drill pipe inside the guide stem may bend and although the drilling tool 12 may accordingly gyrate somewhat in its rotation, the drilling tool will still be kept on a general course straight ahead. I prefer to allow the section of drill pipe within the guide tube to flex or bend between its two spaced bearings in the guide tube rather than to give it a three or multiple point bearing within the guide tube—in order to minimize bearing pressures and wear, and also in order to minimize the forces which would tend to bend the guide tube itself. It will be readily understood that, if a third bearing were provided in the middle of the guide tube, between the two bearings at top and bottom, the section of drill pipe within the guide tube could be kept straight or the bending at least minimized; but that would be at the expense of lateral pressure transmitted to the central parts of the guide tube and tending to bend the guide tube. While the guide tube, under those conditions, would not bend as much as the drill stem itself would tend to bend, and the guide tube would thus still tend to keep a straighter hole than would the plain drill pipe, yet I conceive that a straight guide tube unbent by any stresses imposed from the drill pipe is better adapted to maintain a straight course even though the drilling tool may gyrate or wobble somewhat due to bending of the drill pipe through the guide tube.

The uppermost reaming ring has no primary function while drilling is being done. It may of course finish the rounding out or cleaning up of the hole if the lower reaming ring becomes somewhat worn; but its primary function is to cut the way out of the hole if, by any circumstance, the hole above the device becomes constricted either by swelling of strata or by caving. In any such case the whole device may be gotten out of the drill hole by reaming upwardly past the obstruction or constriction.

While I have described my device as being used during initial drilling of a hole, it may also be used to straighten and round out to size a previously drilled hole. For any such purposes a rock bit may be preferable to a fish-tail, being a better reaming bit.

And, in any use, my device becomes an instant indicator of the wearing of the bit to a size less than gauge. At present the common custom is to run a bit as long as it will make progress, even though so worn down at the sides or edges that the hole is substantially below gauge. Then when a fresh bit is put in, it must start drilling high above the bottom, and by the time it reaches bottom it too is worn below gauge so that it will not drill to full size. If my device be used without the reaming cutters, or without the lower reaming cutter, it will be impossible to make progress when the bit wears to a size smaller than the guide tube. If used as illustrated, the excessive work done by the reaming cutter will indicate the worn-down condition of the bit. The bit can thus be replaced as soon as necessary, and the fresh bit will begin work substantially at the point where the old one left off, and the hole always be kept to gauge.

I am aware that drill stem guides have been heretofore used for the purpose of preventing rubbing and wearing of the drill stem against the well casing or side of the hole; but my invention is to be distinguished from such prior usages. It has been common to mount upon the drill pipe at spaced intervals a series of bearing rings, sleeves or the like, which do not necessarily rotate with the drill pipe. But all such devices of which I am aware have been relatively short in length and therefore do not and cannot have the function of guiding the drill pipe or the drilling tool in a straight course, as they do not contact with a sufficient length of the hole. In contradistinction, it is one of the characteristic features of my device that it is in length, many multiples of its diameter— long enough that, contacting with the hole wall throughout its length, and stiff, it cannot be laterally forced much out of true alinement.

I have now described an illustrative embodiment of my invention in particular and detail. It is to be understood, however, that the invention itself is not limited to such details and particulars except as may be positively so stated in the following claims, which, I intend, shall in view of the novelty of the invention, be broadly interpreted as well as literally.

I claim:

1. In combination with a rotary drill pipe, a non-rotating elongate guide tube supported on and concentrically surrounding the drill pipe and having a rotary bearing upon the drill pipe, there being a circulating fluid passage between said tube and the drill pipe, and a reaming element formed integrally with said bearing, there being a fluid passage extending through said reaming element and the bearing to said circulating fluid passage.

2. In combination with a rotary drill pipe, a guide tube supported on and concentrically surrounding the drill pipe, said guide tube being spaced from the drill pipe to provide a circulating fluid passage and rotational bearings on the drill pipe for the guide tube at its upper and lower ends, there being fluid passages leading through said rotational bearings to the space between said guide tube and the drill pipe.

In witness that I claim the foregoing I have hereunto subscribed my name this 9th day of December, 1929.

JAMES J. SANTIAGO.